Nov. 21, 1950 — E. J. GIERL — 2,531,266
TEAT CUP

Filed March 26, 1947 — 2 Sheets-Sheet 1

Inventor
Edward J. Gierl

By *Clarence A. O'Brien and Harvey B. Jacobson*
Attorneys

Nov. 21, 1950 E. J. GIERL 2,531,266
TEAT CUP
Filed March 26, 1947 2 Sheets-Sheet 2

Inventor
Edward J. Gierl
By Clarence A. O'Brien
and Harvey B. Jacobson
Attorneys Patented Nov. 21, 1950

2,531,266

UNITED STATES PATENT OFFICE 2,531,266

TEAT CUP

Edward J. Gierl, Athens, Wis.

Application March 26, 1947, Serial No. 737,314

2 Claims. (Cl. 31—85)

The present invention relates to new and useful improvements in teat cups for use in connection with milking machines and more particularly to a device of this character embodying an inner expanding and contracting chamber and an outer substantially rigid chamber whereby air under pressure subjected to the outer chamber will contract the inner chamber by a progressive action commencing at or near the base of the teat and progressing downwardly in a manner to effectively and completely squeeze the milk from the teat.

A further object of the invention is to provide a teat cup of this character in which the inner expanding and contracting chamber includes a separate upper chamber with an individual pressure supply tube leading thereto whereby to initially cut off the teat at its base while the lower portion of the expandible and contractible chamber subsequently performs its squeezing action.

A further object of the invention is to provide a device of this character in which the inner chamber has its walls constructed of live rubber of decreasing resiliency toward its lower end whereby the walls will initially contract toward their upper ends and the contracting action will continue progressively downwardly to effectively empty the teat.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
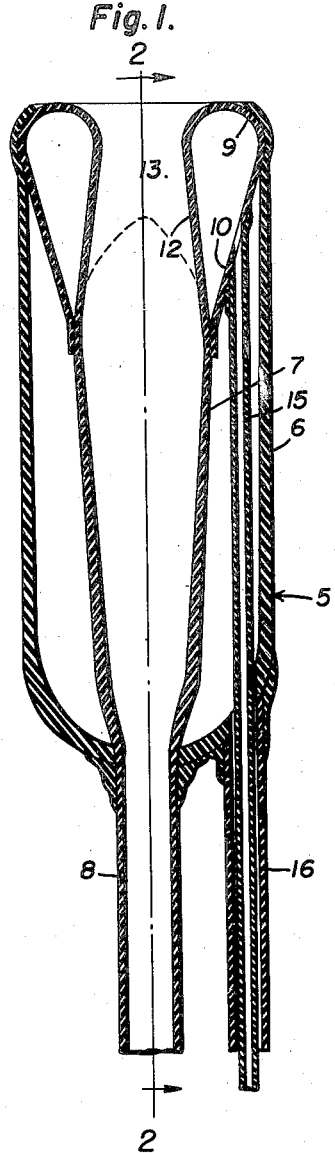
Figure 1 is a vertical sectional view.
Figure 2:
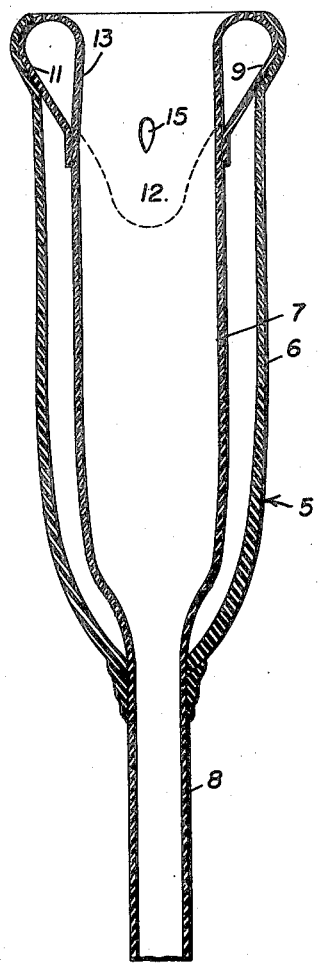
Figure 2 is a similar view taken on the line 2—2 of Figure 1.

Referring now to the drawings in detail, wherein, for the purpose of illustration, I have disclosed a preferred embodiment of the invention, the numeral 5 designates the teat cup generally which includes an outer chamber or cup 6 constructed of suitable material having rigid walls and an inner chamber 7 preferably constructed of live rubber suitably reinforced with fabric thread, the walls of the inner chamber 7 being spaced from the walls of the outer chamber or cup 6.

The inner chamber 7 extends vertically in the outer chamber or cup 6 and is formed at its lower end with a tube 8 which extends through the bottom of the chamber 6 and is suitably secured in position thereto, the tube 8 leading to a vessel or tank in which the milk is collected.

The upper end of the inner chamber 7 is open and is formed with an annular chamber 9 which has its outer upper surface suitably secured to the upper edge of the outer chamber or cup 6 to seal the top of the latter.

The annular chamber 9 is formed at diametrically opposite sides with substantially elongated vertical pockets 10 connected by passages 11 to each other, whereby the annular chamber 9 is formed at diametrically opposite sides with walls 12 of greater area in the region of the pockets 10 and of less area, as shown at 13, in the region of the passages 11.

The formation of the annular chamber 9 at the upper end of the inner chamber 7 constricts the open upper end of the inner chamber, as shown in Figure 1 of the drawings, to provide tight fitting engagement at the base of a teat 14 when placed thereon so that a slight vacuum is created in the inner chamber 7 sufficient to securely hold the cup in position.

A tube 15 extends downwardly in the outer chamber 6 with its upper end connected to the annular chamber 9 at one of the pockets 10 thereof, the tube 15 extending outwardly through the lower portion of the cup through an outer tube 16 in spaced relation from the walls thereof, the outer tube having one end connected to the lower portion of the outer chamber 6.

The other end of the inner tube 15 is connected to a port 17 of an inlet control valve 18 of conventional construction, and the tube 15 is also provided with a branch tube 19 which is connected to a port 20 of an exhaust control valve 21, the valves 18 and 21 being mounted in a casing 22.

The valves 18 and 21 are rotated in the housing 22 in any suitable manner such as through the medium of power-operated gears or the like (not shown).

The valves 18 and 21 are also provided with ports 23 and 24 to which the tube 16 is connected. The valve 18 is provided with a port 25 to which a compressed air line (not shown) is connected, and the valve 21 is provided with a port 26 which constitutes an exhaust port and to which a suction line (not shown) may be attached, if desired.

The valves 18 and 21 are rotated in a direction as shown by the arrows in Figures 3, 4 and 5, whereby the valve 18 will initially open the port 17 with the supply line and subsequently open the port 23, while the valve 21 is arranged to initially open the port 20 with the exhaust port and to subsequently open the port 24.

Figure 3:
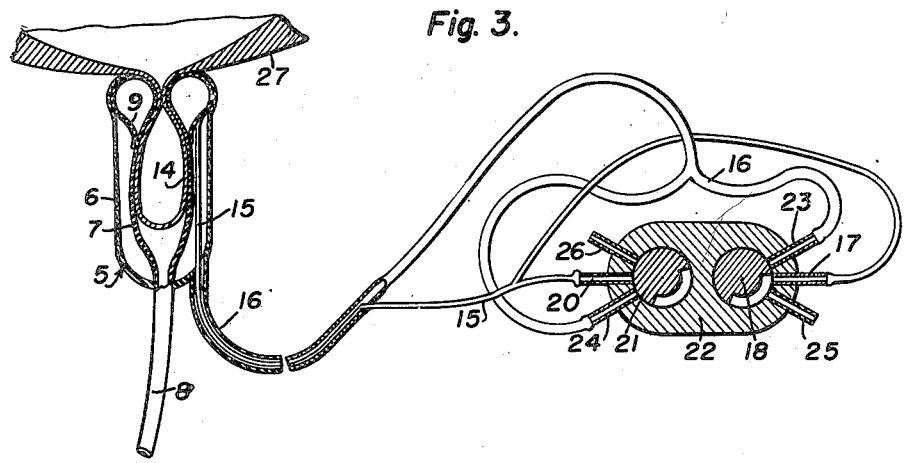
Figure 3 is a vertical sectional view of one of the cups showing the system of connecting the tubes with the control valves for supplying compressed air to the cup and with the valves in position for initially constricting the base of the teat.
Figure 4:
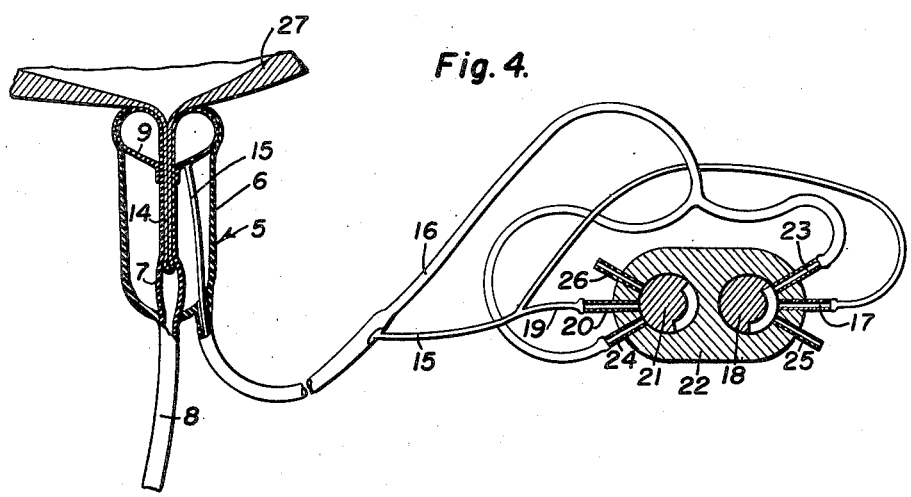
Figure 4 is a similar view showing the position of the valves at the completion of the milking stroke of the cup.
Figure 5:
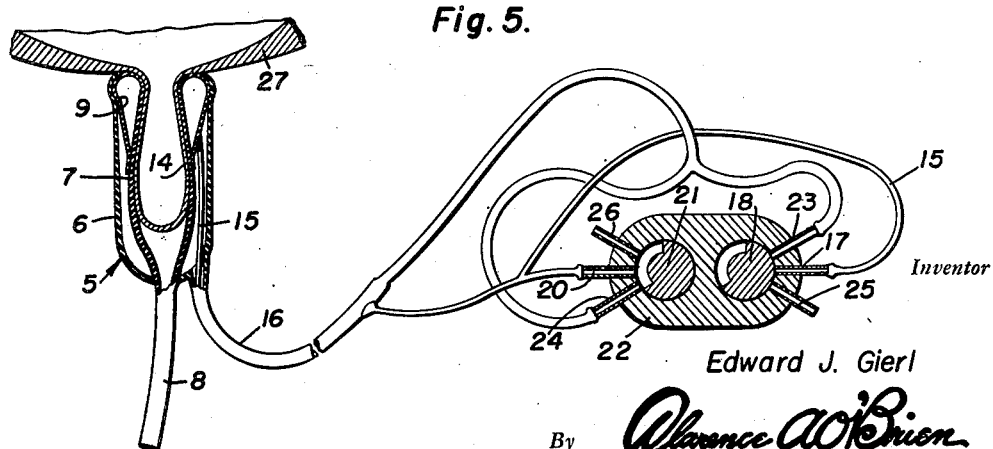
Figure 5 is a similar view showing the valves in position while exhausting the air from the cup to permit refilling of the teat.

Accordingly, in the operation of the device, with the cup 5 placed in position on the teat 14, as shown in Figures 3 to 5, inclusive, and the valves 18 and 21 operated in the manner indicated, the first step in the milking action will occur when the valve 21 is closed and the valve 18 initially opens the port 17 with the supply line whereby to admit air under pressure to the tube 15 leading to the annular chamber 9. The walls 12 of increased area of the pockets 10 will then respond to air pressure in the chamber 9 to constrict the teat at its base, as shown in Figure 3, and thus cut off communication thereof with the udder 27.

The pressure in the chamber 9 is maintained while the valve 18 continues its movement to also open the port 23 leading to the tube 16 whereby pressure is admitted to the outer chamber 6 of the cup to thus contract the walls of the inner chamber 7. The walls of the inner chamber 7 are of increased thickness toward their lower end whereby the contracting action of the inner chamber will first occur at its upper end and gradually progress downwardly, thereby causing a squeezing action on the teat 14 beginning initially adjacent the base of the teat and working downwardly toward its end to thus completely empty the teat, as shown in Figure 4.

As the valves 18 and 21 continue their rotation, the valve 18 will close the ports 17 and 23 leading to the tubes 15 and 16 and to open the ports 20 and 24 to exhaust the air pressure from the chambers of the cup and to allow the teats to again fill, as shown in Figure 5, for subsequent milking operations.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having thus described my invention, what I claim as new is:

1. A teat cup for milking machines comprising an outer vertically elongated rigid chamber and an inner vertically elongated expansible and contractible chamber, said inner chamber having a mouth end for receiving a teat, an annular expansible and contractible chamber at the mouth of the inner chamber normally restricting said mouth and including a pair of vertically elongated pockets at diametrically opposite sides of the annular chamber communicating therewith and depending therefrom alongside said inner chamber, said pockets forming inner walls of increased area to first respond to internal pressure in the annular chamber to compress the said walls against the teat at its base to close the same, and means for introducing air under pressure to said annular chamber and rigid chamber alternately to cause said annular chamber to first contract about the upper end of the teat and said inner chamber to subsequently contract about the remainder of said teat.

2. A teat cup for milking machines comprising an outer substantially rigid chamber and an inner expansible and contractible chamber, said inner chamber having a mouth end for receiving a teat, an annular expansible and contractible chamber at the mouth of the inner chamber normally restricting said mouth and having diametrically opposed inner wall portions of relatively greater resiliency than its remaining inner walls to initially respond to internal pressure to compress the teat at its base, and individual compressed air supply tubes leading to the annular chamber and to the exterior surface of the inner chamber.

EDWARD J. GIERL.

REFERENCES CITED

The following references are of record in the file of this patent:

UNITED STATES PATENTS

| Number | Name | Date |
|---|---|---|
| 923,065 | Mortensen | May 25, 1909 |
| 1,057,486 | Kupfer | Apr. 1, 1913 |
| 1,361,435 | Armes | Dec. 7, 1920 |
| 1,455,672 | Seifert | May 15, 1923 |
| 1,465,002 | Schawang | Aug. 14, 1923 |

FOREIGN PATENTS

| Number | Country | Date |
|---|---|---|
| 281,200 | Germany | Dec. 17, 1914 |
| 59,072 | Denmark | Sept. 29, 1941 |